(12) United States Patent
Ye et al.

(10) Patent No.: US 10,988,170 B2
(45) Date of Patent: Apr. 27, 2021

(54) DRIVER STEER RECOMMENDATION UPON LOSS OF ONE BRAKE CIRCUIT OF A DIAGONAL SPILT LAYOUT

(71) Applicant: Continental Automotive Systems, Inc., Auburn Hills, MI (US)

(72) Inventors: Bo Ye, Rochester Hills, MI (US); Pedro Henriques, Rochester Hills, MI (US); Naren Dhansri, Farmington Hills, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 323 days.

(21) Appl. No.: 16/215,732

(22) Filed: Dec. 11, 2018

(65) Prior Publication Data

US 2020/0180687 A1 Jun. 11, 2020

(51) Int. Cl.
  *B62D 6/00* (2006.01)
  *B60T 11/16* (2006.01)
  *B62D 5/04* (2006.01)
  *B62D 15/02* (2006.01)

(52) U.S. Cl.
  CPC .............. *B62D 6/003* (2013.01); *B60T 11/16* (2013.01); *B62D 5/046* (2013.01); *B62D 5/0409* (2013.01); *B62D 15/025* (2013.01)

(58) Field of Classification Search
  CPC ...... B62D 6/003; B62D 5/0409; B62D 5/046; B60T 11/16
  USPC .......................................................... 701/42
  See application file for complete search history.

(56) References Cited

U.S. PATENT DOCUMENTS 10,787,192 B1 * 9/2020 Katzourakis ........... B62D 5/003
10,843,683 B2 * 11/2020 Akiyama ............... B62D 6/002
2001/0054843 A1 12/2001 Schmidt et al.
(Continued)

FOREIGN PATENT DOCUMENTS

| EP | 1157911 A1 | 11/2001 | |
| EP | 1354788 A1 | 10/2003 | |
| EP | 1462338 A2 * | 9/2004 | ........... B62D 5/0484 |

(Continued)

OTHER PUBLICATIONS

Marin et al., "Malfunction Detection using Spectral Analysis for Automotive Braking Systems," 2016, Publisher: IEEE.*
(Continued)

*Primary Examiner* — Tuan C To (57) ABSTRACT

A method and system corrects steering of a vehicle upon a brake system malfunction. The brake system has a diagonal split layout. An electronic brake system (EBS) controls operation of the master cylinder. An electronic power steering system (EPS) includes sensors to measure motion and torque of a steering column of the vehicle and includes a motor to provide torque to the steering column. During driver braking when one of the brake circuits has failed, the system calculates a yaw torque value introduced by a driver braking with just one functioning brake circuit. Based on a steer wheel angle and a steer wheel torque obtained from the sensors of the EPS and on the yaw torque value, a steer wheel torque request defining a steer wheel torque/angle needed to counter the yaw torque value is calculated and sent the EPS which operates the motor to compensate for the steering deviation.

10 Claims, 6 Drawing Sheets

(56) References Cited

U.S. PATENT DOCUMENTS

2010/0324784 A1\* 12/2010 Yu ..................... B62D 5/0472
                                                        701/42
2018/0237004 A1\* 8/2018 Nasu ................. B60L 15/2009

FOREIGN PATENT DOCUMENTS

EP            1386802 B1 \*  3/2011    ............... B60T 8/00
EP            2487079 A1 \*  8/2012    .......... B60T 8/17555

OTHER PUBLICATIONS

Xinlei et al., "Study on the Torque Allocation Strategy of the Distributed Driving Electric Vehicles Running in Straight Line with a Single Failure Motor."\*
International Search Report and Written Opinion dated Apr. 3, 2020 from corresponding International Patent Application No. PCT/US2019/065670.

\* cited by examiner

DRIVER STEER RECOMMENDATION UPON LOSS OF ONE BRAKE CIRCUIT OF A DIAGONAL SPILT LAYOUT

FIELD

This invention relates to vehicle brake systems having a diagonal split layout and, more particularly, to a system and method for recommending a driver steering adjustment to compensate for a self-steer effect when one of the brake circuits is non-functional.

BACKGROUND

Figure 1:
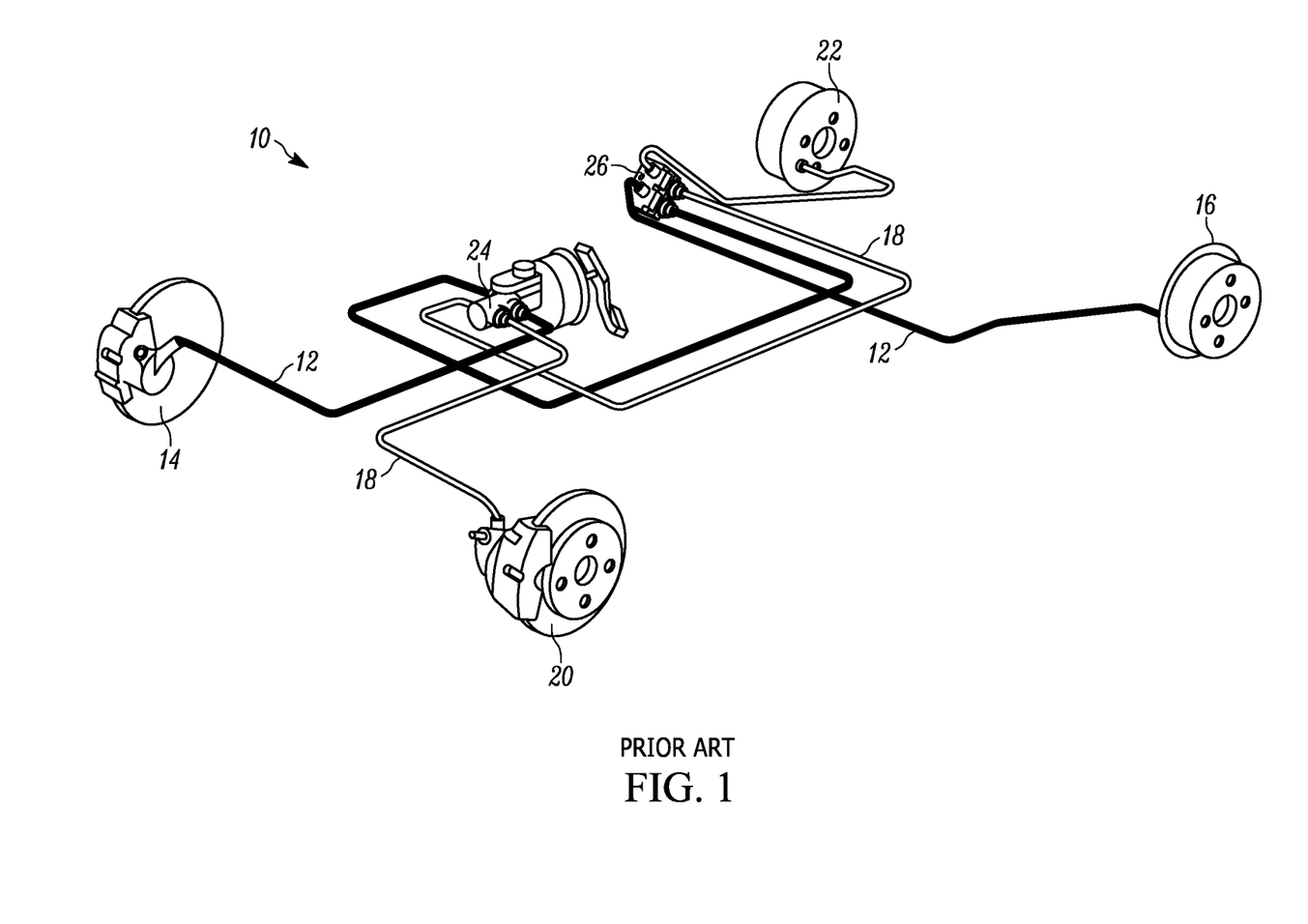
FIG. 1 is a schematic illustration of a vehicle brake system having a diagonal split layout.

With reference to FIG. 1, a conventional vehicle brake system is shown, generally indicated at 10 having a diagonal split layout. The system 10 includes two brake circuits. A first circuit includes a first hydraulic brake line 12 connected between a right front disc brake 14 and a left rear drum brake 16, and the second circuit includes a second hydraulic brake line 18 connected between a left front disc brake 20 and a right rear drum brake 22. A tandem master cylinder 24 controls fluid flow in the brake lines 12, 18. A brake pressure control valve 26 is also provided.

With the system 10, if one of the circuits (brake line 12 or 18) fails or is inoperable, braking is only available at two diagonally disposed wheels (front left and rear right wheels or front right and rear left wheels). In a hard braking situation, the vehicle tends to auto-steer towards the front wheel side which has brake torque, which can increase the likelihood of skidding and possibly losing control of the vehicle.

Thus, there is a need in a diagonal split braking system to eliminate an auto-steer effect when one of the brake circuits is non-functional.

SUMMARY

An object of the invention is to fulfill the need referred to above. In accordance with the principles of an embodiment, this objective is achieved by a method of correcting steering of a vehicle upon a brake system malfunction. The brake system has a diagonal split layout including two brake circuits with a first brake circuit including a first hydraulic brake line connected between a right front brake and a left rear brake, and with a second brake circuit including a second hydraulic brake line connected between a left front brake and a right rear brake. The brake system further includes a master cylinder constructed and arranged to control fluid flow in the brake lines. The method provides an electronic brake system (EBS) including a control unit having a processor circuit. The control unit is constructed and arranged to control operation of the master cylinder. An electronic power steering system (EPS) is provided that including a processor circuit, sensors constructed and arranged to measure motion and torque of a steering column of the vehicle, and a motor constructed and arranged to provide torque to the steering column. During driver braking, the EBS determines if one of the brake circuits has failed causing steering of the vehicle to deviate towards a front wheel side that has brake torque. When one of the brake circuits has failed, one of the processor circuits calculates a yaw torque value introduced by a driver braking with just one functioning brake circuit. Based on a steer wheel angle and a steer wheel torque obtained from the sensors of the EPS and on the yaw torque value, the processor circuit calculates a steer wheel torque request defining a steer wheel torque/angle needed to counter the yaw torque value. The steer wheel torque request is sent to the EPS, with the EPS providing a driver steer recommendation to compensate for the steering deviation. If the driver accepts the recommendation, the EPS operates the motor to compensate for the steering deviation.

In accordance with another aspect of an embodiment, a control system is provided for correcting steering of a vehicle upon a brake system malfunction. The brake system has a diagonal split layout including two brake circuits with a first brake circuit including a first hydraulic brake line connected between a right front brake and a left rear brake, and with a second brake circuit including a second hydraulic brake line connected between a left front brake and a right rear brake. The brake system further includes a master cylinder constructed and arranged to control fluid flow in the brake lines. The control system includes an electronic power steering system (EPS) having a processor circuit, and sensors constructed and arranged to measure motion and torque of a steering column of the vehicle and includes a motor constructed and arranged to provide torque to the steering column. An electronic brake system (EBS) is provided and includes a control unit having a processor circuit. The control unit is constructed and arranged to control operation of the master cylinder. A communication bus electrically connects the EPS and the EBS. During driver braking when one of the brake circuits has failed causing steering of the vehicle to deviate towards a front wheel side that has brake torque, at least one of the processor circuits is constructed and arranged to calculate a yaw torque value introduced by a driver braking with just one functioning brake circuit. Based on a steer wheel angle and a steer wheel torque obtained from the sensors of the EPS and on the yaw torque value, the processor circuit calculates a steer wheel torque request defining a steer wheel torque/angle needed to counter the yaw torque value. The steer wheel torque request is sent to the EPS, and based on the steer wheel torque request, the EPS is constructed and arranged to operate the motor to compensate for the steering deviation.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, in which.

DETAILED DESCRIPTION OF THE EXEMPLARY EMBODIMENT

Figure 2:
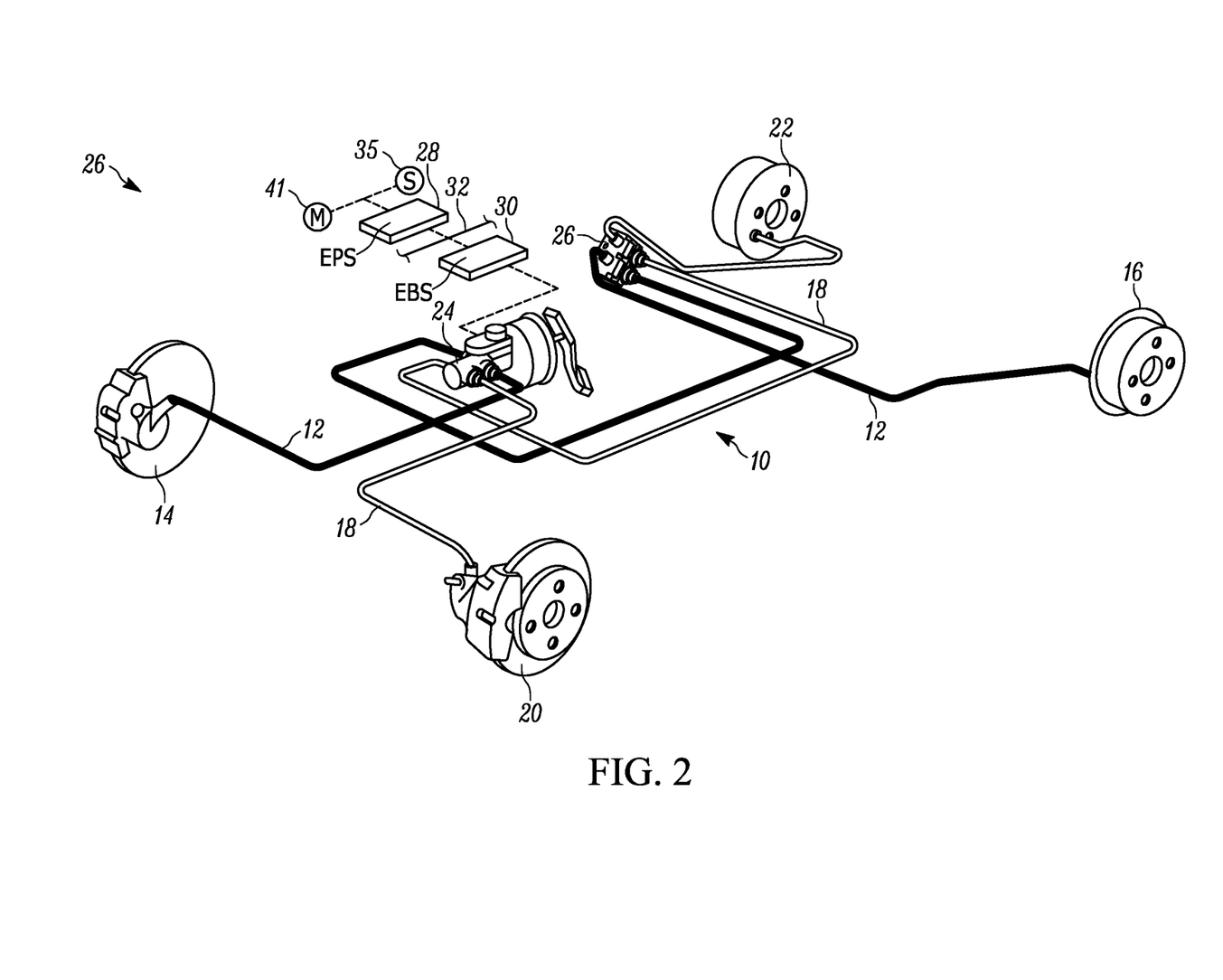
FIG. 2 is schematic illustration of a control system including a vehicle brake system having a diagonal split layout, provided in accordance with an embodiment.

Referring to FIG. 2, a vehicle control system is shown, generally indicated at 26, in accordance with an embodiment. The system 26 includes a conventional vehicle brake system 10 of FIG. 1 having a diagonal split layout. The brake system 10 includes two brake circuits. A first circuit includes a first hydraulic brake line 12 connected between a right front disc brake 14 of a right front wheel and a left rear drum brake 16 of a left rear wheel, and the second circuit includes a second hydraulic brake line 18 connected between a left front disc brake 20 of a left front wheel and a right rear drum brake 22 of a right rear wheel. A tandem master cylinder 24 controls fluid flow in the brake lines 12, 18. A brake pressure control valve 26 is also provided. The wheels are not shown in FIG. 2.

Figure 3:
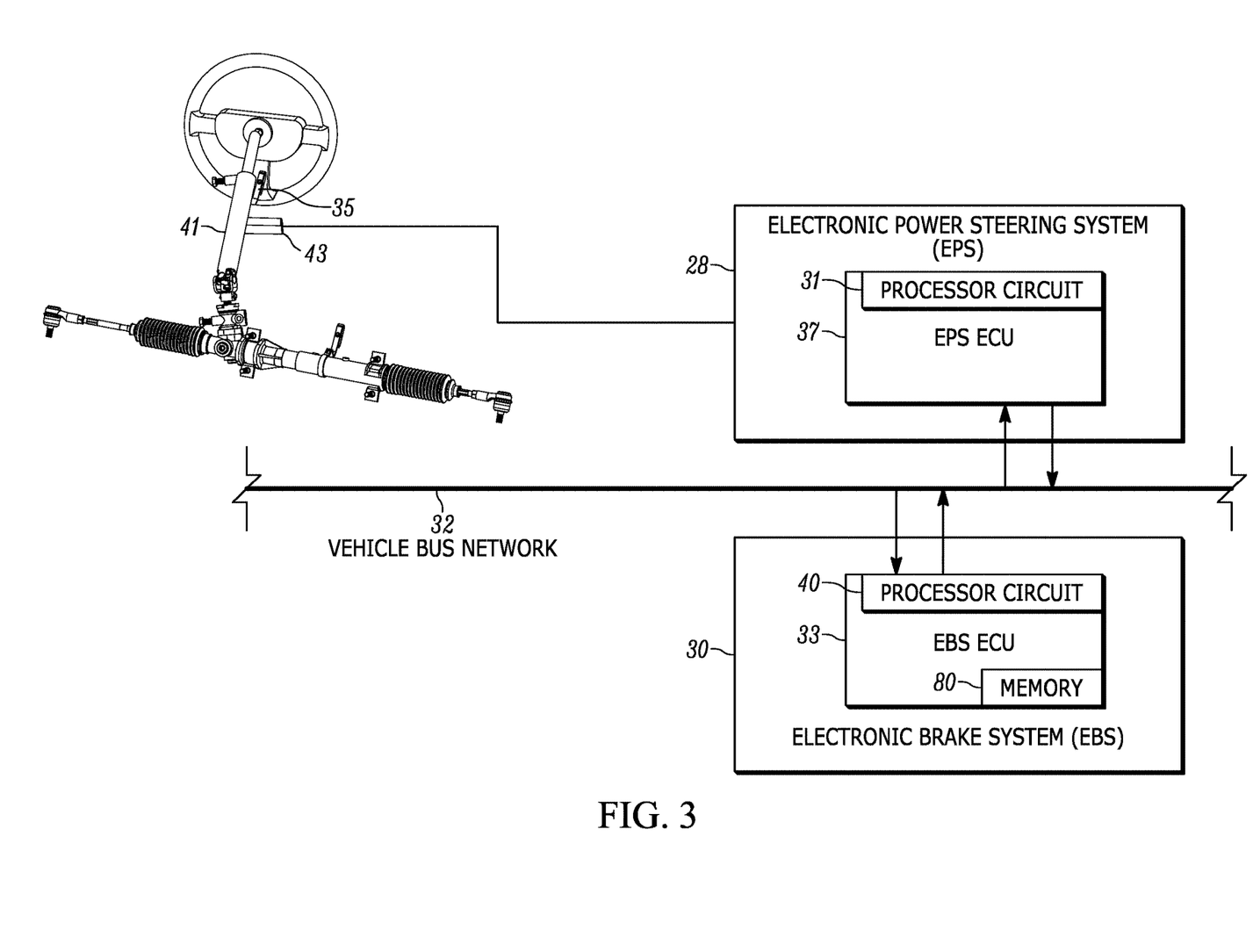
FIG. 3 is a schematic illustration of the electronic power steering system and the electronic brake system of the control system of FIG. 2 shown coupled to a vehicle bus network.

The vehicle control system 26 includes an electronic power steering system (EPS) 28 and an electronic brake system (EBS) 30, each of which is electrically shown coupled to a vehicle bus network 32. With reference FIG. 3, the EBS 30 includes an electronic control unit (ECU) 33, which can evaluate signals from various sensors such as wheel speed sensors (not shown) that monitor the rotational behavior of the vehicle. The ECU 33 controls a pump of the master cylinder 24 and valves (not shown) of the conventional brake system 10 in accordance with a situation-specific control algorithm. The EPS 28 includes a processor circuit 31 and sensors 35 such as a torque angle sensor and steering angle sensor to measure the motion and torque of the steering column 41. This information provides data for the ECU 37 to apply varying amounts of assistive torque supplied from an electric motor 43 to match driving conditions. Further function of the EPS 28 and EBS 30 will be explained below.

Figure 4:
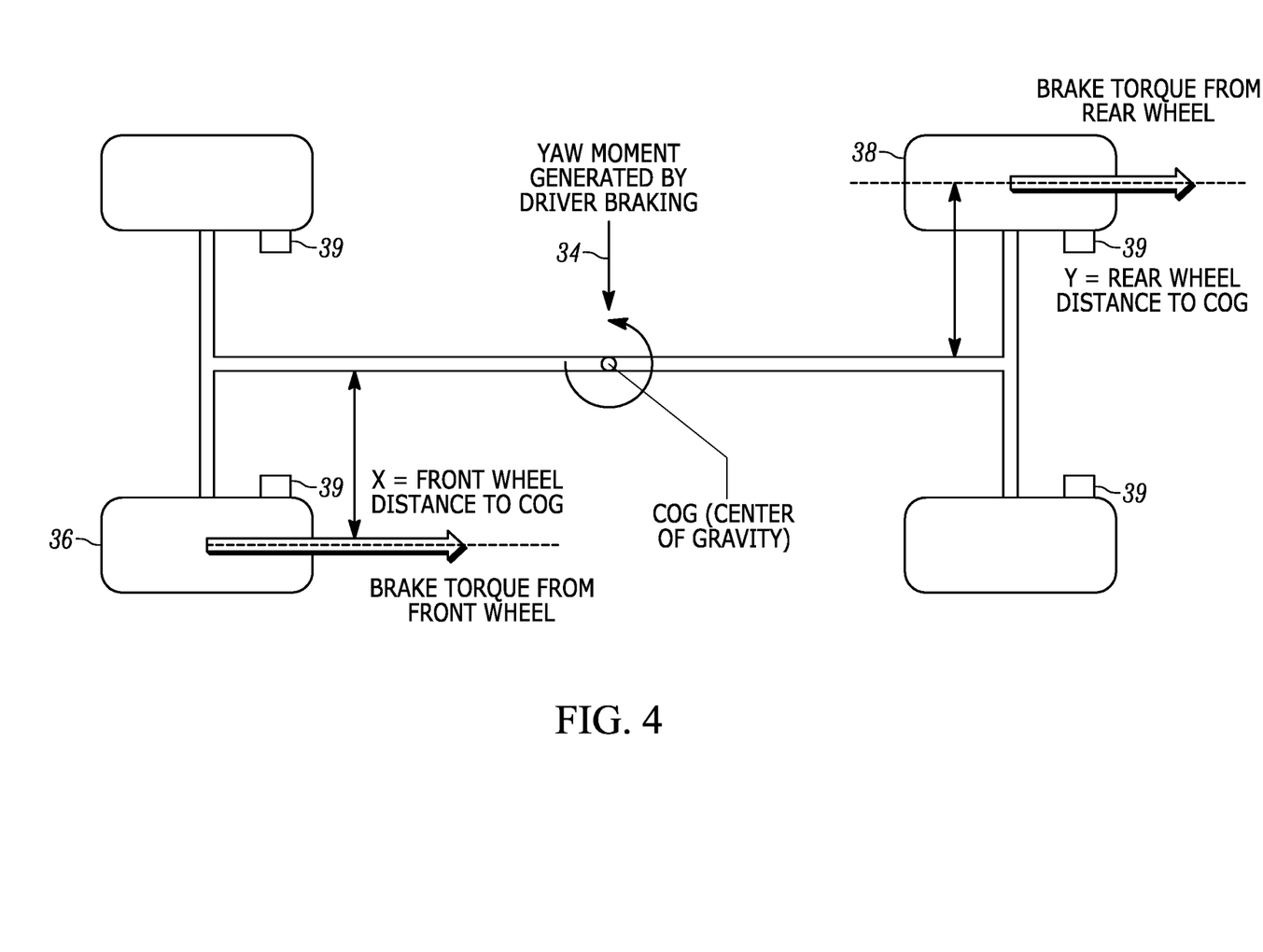
FIG. 4 is a schematic illustration of effects of driver braking of the vehicle brake system of FIG. 2 when only one brake circuit is operative.

With reference to FIG. 4, if one of the circuits (e.g., brake line 12 of FIG. 2) fails or is inoperable, braking is only available at two diagonally disposed wheels, front left wheel 36 and rear right wheel 38. A yaw moment 34 is generated by driver braking and brake torque is created at both the front wheel 36 and diagonally disposed rear wheel 38. This causes steering of the vehicle to deviate towards the front wheel side that has brake torque. To determine brake torque, a pressure sensor is provided in the EBS 30 to measure the master cylinder pressure. Brake torque is converted from brake pressure based on vehicle foundation brake characteristics. This conversion (between pressure-bar and torque-Nm) is controlled/calibrated with parameters once vehicle and foundation brake is decided. Thus, wheel brake pressure is normally estimated by a wheel pressure model within EBS software for a vehicle without individual wheel pressure sensors. Alternatively, brake torque can be can be determined form data obtained by brake pressure sensor 39 associated with each wheel.

Figure 5:
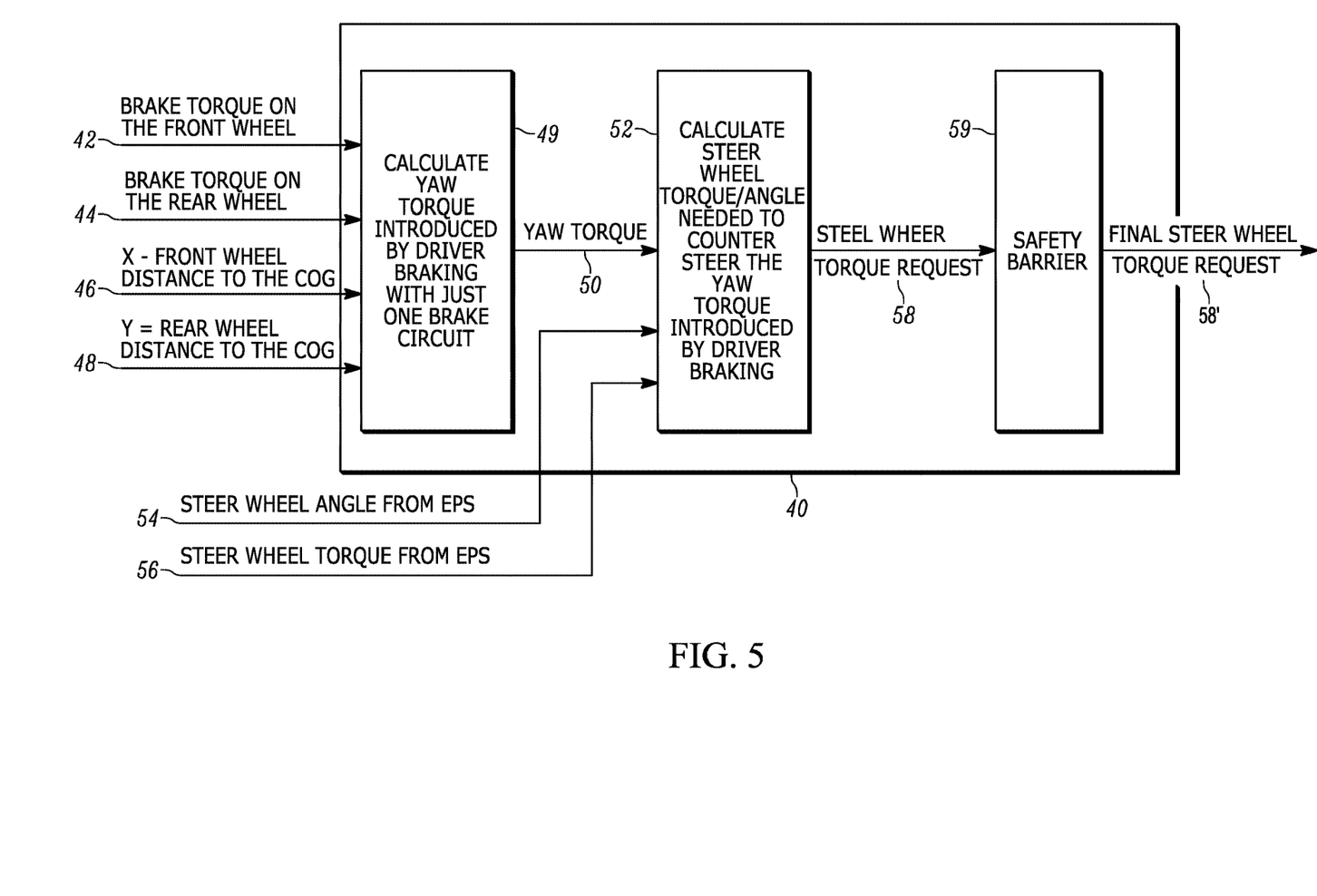
FIG. 5 is schematic illustration showing calculation of final steer wheel torque request to counter yaw torque introduced by driver braking under the conditions of FIG. 4.

FIG. 5 shows the calculation of steer wheel torque by a processor circuit 40 of the EBS ECU 30 in accordance with an embodiment. Based on inputs of brake torque 42 on the front wheel 36, brake torque 44 on the rear wheel 38, the X-distance 46 of the front wheel 36 to the center of gravity (COG) of the vehicle, and the Y-distance 48 of the rear wheel 38 to the COG, in block 49, the processor circuit 40 calculates a Yawtorque 50 value introduced by the driver braking with just the one functioning brake circuit. In block 52, based on Yawtorque 50 and the steer wheel angle 54 and the steer wheel torque 56 obtained from the sensors 35 of the EPS 28, a steer wheel torque request 58 is calculated by the processor circuit 40 which is a steering wheel torque/angle needed to counter the Yawtorque 50 introduced by the driver braking. Next, in block 59, the processor circuit 40 can adjust or limit the steer wheel torque request 58 based on a safety requirement (e.g., road conditions, vehicle speed) to prevent an oversteer or understeer condition. The processor circuit 40 then outputs a final steer wheel torque request 58'.

It is noted that since the EBS and the EPS are connected by the bus 32, instead of the processor circuit 40 of the EBS performing the above-mentioned calculations, data from the EBS can be sent to the EPS and the processor circuit 31 of the EPS can perform the above-mentioned calculations or the calculations can be performed by any other processor circuit that is available on the bus 32. Such calculations are known by use of the Driver Steering Recommendation software of Continental Corporation which generates an additional steering wheel torque offset to give a driver advice on how to react the right way when braking (with a fully functional brake system) on roads with different friction coefficients.

Figure 6:
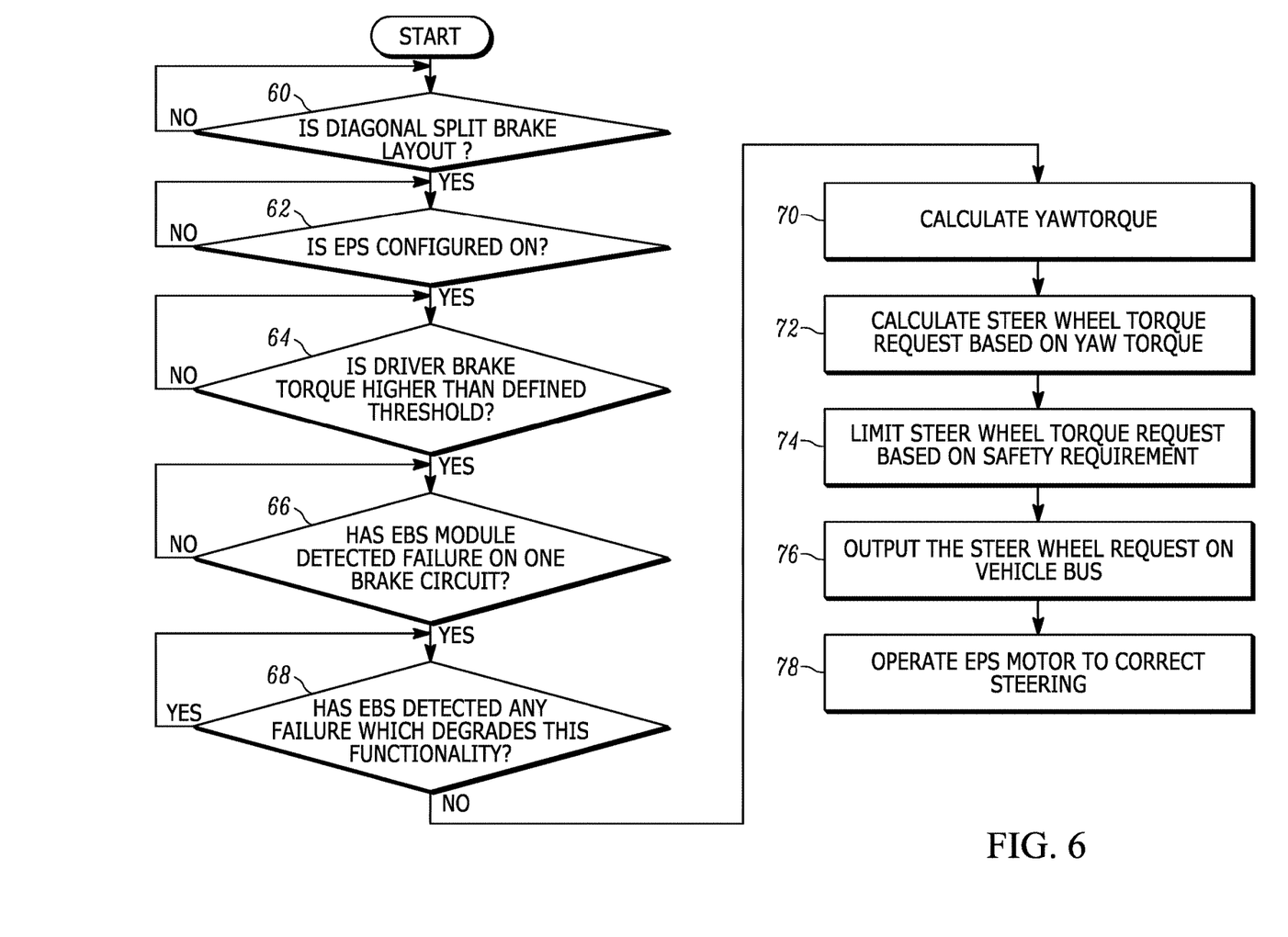
FIG. 6 is flowchart of a process of correcting steering, using the system of FIG. 2, when only one circuit of the brake system 10 is operative.

A process of correcting steering, using the system 26, when only one circuit of the brake system 10 is operative will be appreciated with reference to FIG. 6. In step 60, the EBS 30 determines if the brake layout is a diagonal split layout. If so, in step 62, the EPS 28 is checked to see of it is configured as "on". If the EPS 28 is on, in step 64, the EBS 30 determines if the driver brake torque (from brake pressure sensors 39) is higher than a defined threshold and if so, in step 66, it is determined if the EBS 30 has detected a failure on one of the two brake circuits of brake system 10. In step 68, the EBS 30 detects whether there is any failure which degrades the functionality of the operating brake circuit of brake system 10. If there is no such failure, then in step 70, the processor circuit 40 calculates Yawtorque 50 in the manner described in FIG. 5. Thereafter, the steer wheel torque request 58 is calculated in the manner described in FIG. 5. Next, in step 72, it is determined if the wheel torque request 58 needs to be adjusted or limited based on a safety requirement as noted above. Thereafter, the EBS 30 outputs the final steer wheel request 58' on the vehicle bus 32. In step 78, the EPS 28 receives the final steer wheel request 58' and based thereon the EPS 28 provides the driver with a steering recommendation such as by an audible tone or a visual indication. If the driver accepts the recommendation by providing an input, the EPS 28 operates the motor 43 associated with steering column 41 to compensate for the deviated steering due to only one of the brake circuits being functional. It can be appreciated that, if desired, the ESP 28 can compensate for the deviated steering automatically, without input from the driver.

The operations and algorithms described herein can be implemented as executable code within the ECU 37 or ECU 33 having respective processor circuits 31 and 40 as described, or stored on a standalone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 80 can be implemented, for example, using a non-volatile memory such as a programmable read only memory (PROM) or an EPROM, and/or a volatile memory such as a DRAM, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of correcting steering of a vehicle upon a brake system malfunction, the brake system having a diagonal split layout including two brake circuits with a first brake circuit including a first hydraulic brake line connected between a right front brake and a left rear brake, and with a second brake circuit including a second hydraulic brake line connected between a left front brake and a right rear brake, the brake system further including a master cylinder constructed and arranged to control fluid flow in the brake lines, the method comprising the steps of:
   providing an electronic brake system (EBS) including a control unit having a processor circuit, the control unit being constructed and arranged to control operation of the master cylinder,
   providing an electronic power steering system (EPS) including a processor circuit, and sensors constructed and arranged to measure motion and torque of a steering column of the vehicle and including a motor constructed and arranged to provide torque to the steering column,
   determining by the EBS during driver braking, if one of the brake circuits has failed causing steering of the vehicle to deviate towards a front wheel side that has brake torque, and if one of the brake circuits has failed:
      calculating, in one of the processor circuits, a yaw torque value introduced by a driver braking with just one functioning brake circuit,
      based on a steer wheel angle and a steer wheel torque obtained from the sensors of the EPS and on the yaw torque value, calculating in the one processor circuit, a steer wheel torque request defining a steer wheel torque/angle needed to counter the yaw torque value, and
   sending the steer wheel torque request to the EPS, with the EPS providing a driver steer recommendation to compensate for the steering deviation.

2. The method of claim 1, wherein, if the driver accepts the driver steer recommendation, the method further includes:
   causing the EPS to operate the motor to compensate for the steering deviation.

3. The method of claim 1, wherein calculating the yaw torque value is based on inputs of brake torque on a front wheel, brake torque on a rear wheel, an X-distance of the front wheel to a center of gravity (COG) of the vehicle, and a Y-distance of the rear wheel to the COG.

4. The method of claim 1, wherein the brake torques are obtained by a brake torque sensor associated with the front wheel and a brake torque sensor associated with the rear wheel.

5. The method of claim 1, wherein prior to the sending step, the method further includes adjusting the steer wheel torque request based on a safety requirement of the vehicle so as to prevent an oversteer or understeer condition.

6. The method of claim 1, wherein the EBS and the EPS are electrically connected to a common communication bus.

7. The method of claim 1, wherein the calculating occurs in the processor circuit of the EBS.

8. A control system for correcting steering of a vehicle upon a brake system malfunction, the brake system having a diagonal split layout including two brake circuits with a first brake circuit including a first hydraulic brake line connected between a right front brake and a left rear brake, and with a second brake circuit including a second hydraulic brake line connected between a left front brake and a right rear brake, the brake system further including a master cylinder constructed and arranged to control fluid flow in the brake lines, the control system comprising:
   an electronic power steering system (EPS) including a processor circuit, and sensors constructed and arranged to measure motion and torque of a steering column of the vehicle and including a motor constructed and arranged to provide torque to the steering column,
   an electronic brake system (EBS) including a control unit having a processor circuit, the control unit being constructed and arranged to control operation of the master cylinder, and
   a communication bus electrically connecting the EPS and the EBS,
   wherein during driver braking when one of the brake circuits has failed causing steering of the vehicle to deviate towards a front wheel side that has brake torque, at least one of the processor circuits is constructed and arranged to:
      calculate a yaw torque value introduced by a driver braking with just one functioning brake circuit,
      based on a steer wheel angle and a steer wheel torque obtained from the sensors of the EPS and on the yaw torque value, calculate a steer wheel torque request defining a steer wheel torque/angle needed to counter the yaw torque value, and
      send the steer wheel torque request to the EPS, and
   wherein, based on the steer wheel torque request, the EPS is constructed and arranged to operate the motor to compensate for the steering deviation.

9. The system of claim 8, wherein the EBS includes a brake pressure sensor associated with each wheel of the vehicle.

10. The system of claim 9, wherein the processor circuit is constructed and arranged to calculate the yaw torque value based on inputs of brake torque on a front wheel, brake torque on a rear wheel, an X-distance of the front wheel to a center of gravity (COG) of the vehicle, and a Y-distance of the rear wheel to the COG.

\* \* \* \* \*